US009264657B2

(12) United States Patent
Tan et al.

(10) Patent No.: US 9,264,657 B2
(45) Date of Patent: *Feb. 16, 2016

(54) METHOD AND APPARATUS FOR PROVIDING A COPY-PROTECTED VIDEO SIGNAL

(75) Inventors: Baolin Tan, Sevenage (GB); Mazen Abdin, Stevenage (GB)

(73) Assignee: DCS COPY PROTECTION LIMITED, Steeton (GB)

(*) Notice: Subject to any disclaimer, the term of this patent is extended or adjusted under 35 U.S.C. 154(b) by 0 days.

This patent is subject to a terminal disclaimer.

(21) Appl. No.: 13/231,724

(22) Filed: Sep. 13, 2011

(65) Prior Publication Data

US 2012/0002950 A1 Jan. 5, 2012

Related U.S. Application Data

(63) Continuation of application No. 10/520,027, filed as application No. PCT/GB03/02782 on Jun. 30, 2003, now Pat. No. 8,019,201.

(30) Foreign Application Priority Data

Jun. 28, 2002 (GB) .................................. 0215040.7

(51) Int. Cl.
*H04N 5/93* (2006.01)
*H04N 5/913* (2006.01)
*H04N 7/169* (2011.01)
(52) U.S. Cl.
CPC ............. *H04N 5/913* (2013.01); *H04N 7/1693* (2013.01); *H04N 2005/91314* (2013.01)
(58) Field of Classification Search
CPC .................... H04N 5/913; H04N 2005/91314; H04N 7/1693

USPC ......................................................... 386/252
See application file for complete search history.

(56) References Cited

U.S. PATENT DOCUMENTS 4,086,634 A 4/1978 Cook
4,100,575 A 7/1978 Morio et al.
(Continued)

FOREIGN PATENT DOCUMENTS

DE 3806411 9/1989
EP 0372601 6/1990
(Continued)

OTHER PUBLICATIONS

Foede, W. "Video Copy Processor" Elektor Electronics, Elektor Publishers Ltd., Canterbury GB, Nov. 1, 1997, vol. 23, No. 20, pp. 28-33.

*Primary Examiner* — William Tran
(74) *Attorney, Agent, or Firm* — DLA Piper LLP (US)

(57) ABSTRACT

A anti-copy programme signal is provided. Copies of the anti-copy video pulses made on a video recorder experience reduced quality and interference in playback making them unpleasant to watch. The uncopied signal can be viewed without any material effect on picture quality. The signal comprises a pulse added to each line of the signal throughout both the visible picture region and throughout the vertical blanking region, as well as a first modulated wave-form added to the vertical synchronization pulses of the signal and a second modulated wave-form added to several lines of the picture signal before the vertical blanking section. The presence of all three of these features together has been found to provide a surprising accumulative effectiveness in causing interference in the reproduction of the modified video signal during playback of the copied video signal, that is greater than the effectiveness provided by the different features taken separately.

17 Claims, 6 Drawing Sheets

(56) References Cited

U.S. PATENT DOCUMENTS

| | | | |
|---|---|---|---|
| 4,163,253 A | 7/1979 | Morio et al. | |
| 4,571,642 A | 2/1986 | Hofstein | |
| 4,577,216 A | 3/1986 | Ryan | |
| 4,626,890 A | 12/1986 | Ryan | |
| 4,631,603 A | 12/1986 | Ryan | |
| 4,644,422 A | 2/1987 | Bedini | |
| 4,695,901 A | 9/1987 | Ryan | |
| 4,802,212 A | 1/1989 | Freeman et al. | |
| 4,819,098 A | 4/1989 | Ryan | |
| 4,888,649 A | 12/1989 | Kagota | |
| 5,073,925 A | 12/1991 | Nagata et al. | |
| 5,155,767 A | 10/1992 | Noller et al. | |
| 5,161,210 A | 11/1992 | Druyvesteyn et al. | |
| 5,194,965 A | 3/1993 | Quan et al. | |
| 5,251,041 A | 10/1993 | Young et al. | |
| 5,315,448 A | 5/1994 | Ryan | |
| 5,394,274 A | 2/1995 | Kahn et al. | |
| 5,513,260 A | 4/1996 | Ryan | |
| 5,523,853 A | 6/1996 | Yamashita et al. | |
| 5,583,936 A | 12/1996 | Wonfor et al. | |
| 5,585,929 A | 12/1996 | Young et al. | |
| 5,608,799 A | 3/1997 | Ryan et al. | |
| 5,719,937 A | 2/1998 | Warren et al. | |
| 5,737,417 A | 4/1998 | Buynak et al. | |
| 5,784,523 A | 7/1998 | Quan et al. | |
| 5,822,360 A | 10/1998 | Lee et al. | |
| 5,907,656 A | 5/1999 | Oguro et al. | |
| 6,018,608 A | 1/2000 | Sakashita et al. | |
| 6,035,094 A | 3/2000 | Kori | |
| 6,041,158 A | 3/2000 | Sato | |
| 6,064,442 A | 5/2000 | Aihara | |
| 6,091,822 A | 7/2000 | Mellows et al. | |
| 6,188,832 B1 | 2/2001 | Ryan | |
| 6,222,978 B1 | 4/2001 | Hirai | |
| 6,268,889 B1 | 7/2001 | Koori | |
| 6,271,889 B1 | 8/2001 | Bohm et al. | |
| 6,327,422 B1 | 12/2001 | Quan et al. | |
| 6,404,889 B1 * | 6/2002 | Ryan et al. | 380/201 |
| 6,404,974 B1 * | 6/2002 | Franklin | 386/254 |
| 6,459,795 B1 | 10/2002 | Quan | |
| 6,516,132 B1 | 2/2003 | Wrobleski et al. | |
| 6,600,873 B1 | 7/2003 | Brill et al. | |
| 6,839,433 B1 * | 1/2005 | Quan | 380/206 |
| 6,882,490 B1 | 4/2005 | Tan et al. | |
| 6,904,153 B1 | 6/2005 | Wijnen et al. | |
| 6,956,621 B2 | 10/2005 | Movshovish et al. | |
| 7,236,683 B2 | 6/2007 | Quan | |
| 7,471,479 B2 | 12/2008 | Tan et al. | |
| 8,019,201 B2 | 9/2011 | Tan et al. | |
| 2002/0009000 A1 | 1/2002 | Goldberg et al. | |
| 2003/0108201 A1 | 6/2003 | Rumreich | |
| 2004/0039913 A1 | 2/2004 | Kruse | |
| 2004/0252615 A1 | 12/2004 | Keech | |
| 2005/0111661 A1 | 5/2005 | Wijnen | |
| 2005/0141876 A1 | 6/2005 | Quan | |
| 2005/0162771 A1 | 7/2005 | Tan | |
| 2007/0030968 A1 | 2/2007 | Tan et al. | |
| 2008/0089202 A1 | 4/2008 | Robinson et al. | |
| 2009/0202215 A1 | 8/2009 | Tan | |
| 2009/0297125 A1 | 12/2009 | Wijnen et al. | |

FOREIGN PATENT DOCUMENTS

| | | |
|---|---|---|
| EP | 0392612 A | 10/1990 |
| EP | 0763936 | 3/1997 |
| EP | 0831648 | 3/1998 |
| EP | 1169707 | 12/2003 |
| FR | 2740897 | 5/1997 |
| GB | 1571386 | 7/1980 |
| GB | 2164481 | 3/1986 |
| GB | 2199689 | 7/1988 |
| GB | 2348736 | 10/2000 |
| WO | WO 88/02588 | 4/1988 |
| WO | WO 96/00963 | 1/1996 |
| WO | WO 96/31878 | 10/1996 |
| WO | 9900977 | 1/1999 |
| WO | 9957723 A | 11/1999 |
| WO | 0174068 A1 | 10/2001 |
| WO | WO 01/76240 | 10/2001 |
| WO | WO 01/88915 | 11/2001 |
| WO | WO 02/15557 | 2/2002 |
| WO | WO 03/065716 | 2/2003 |
| WO | WO 2004/066295 | 8/2004 |

* cited by examiner

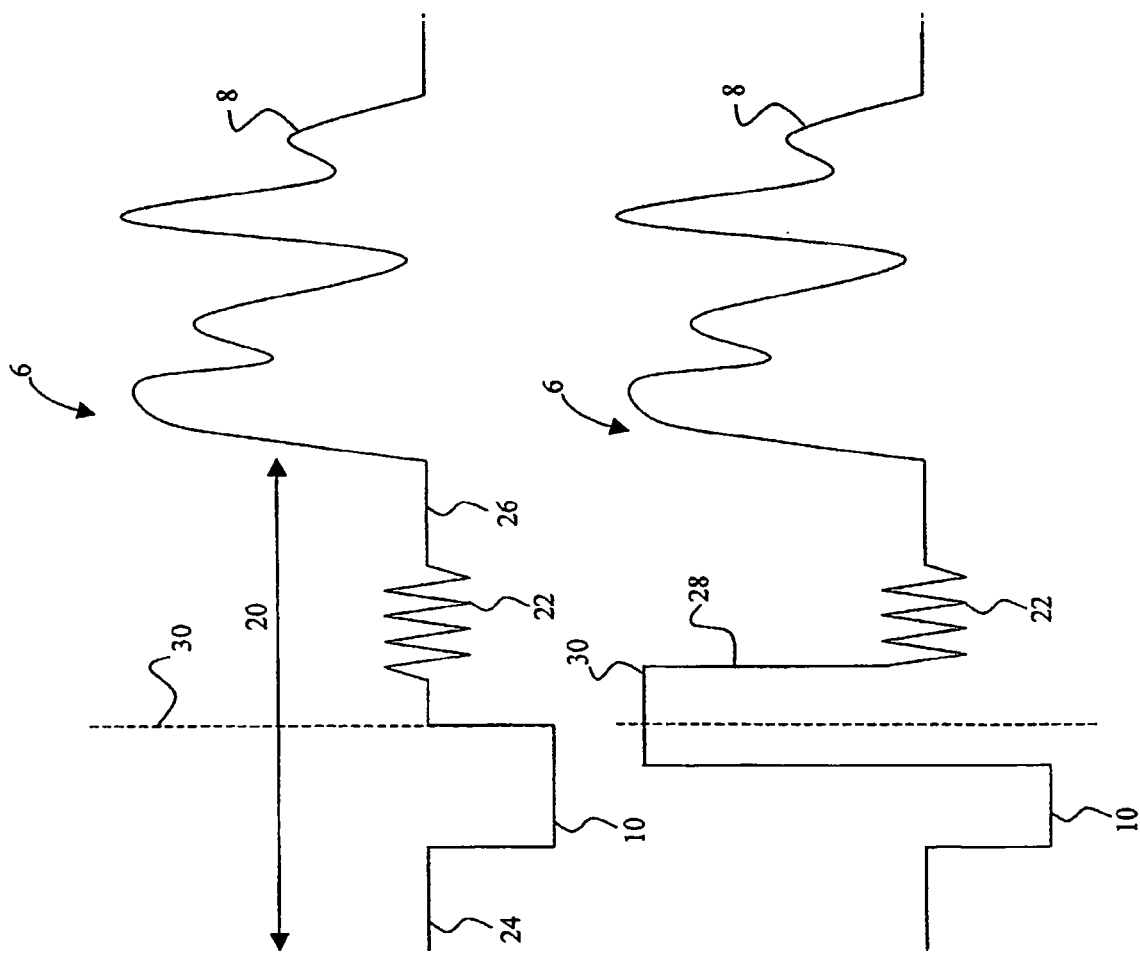

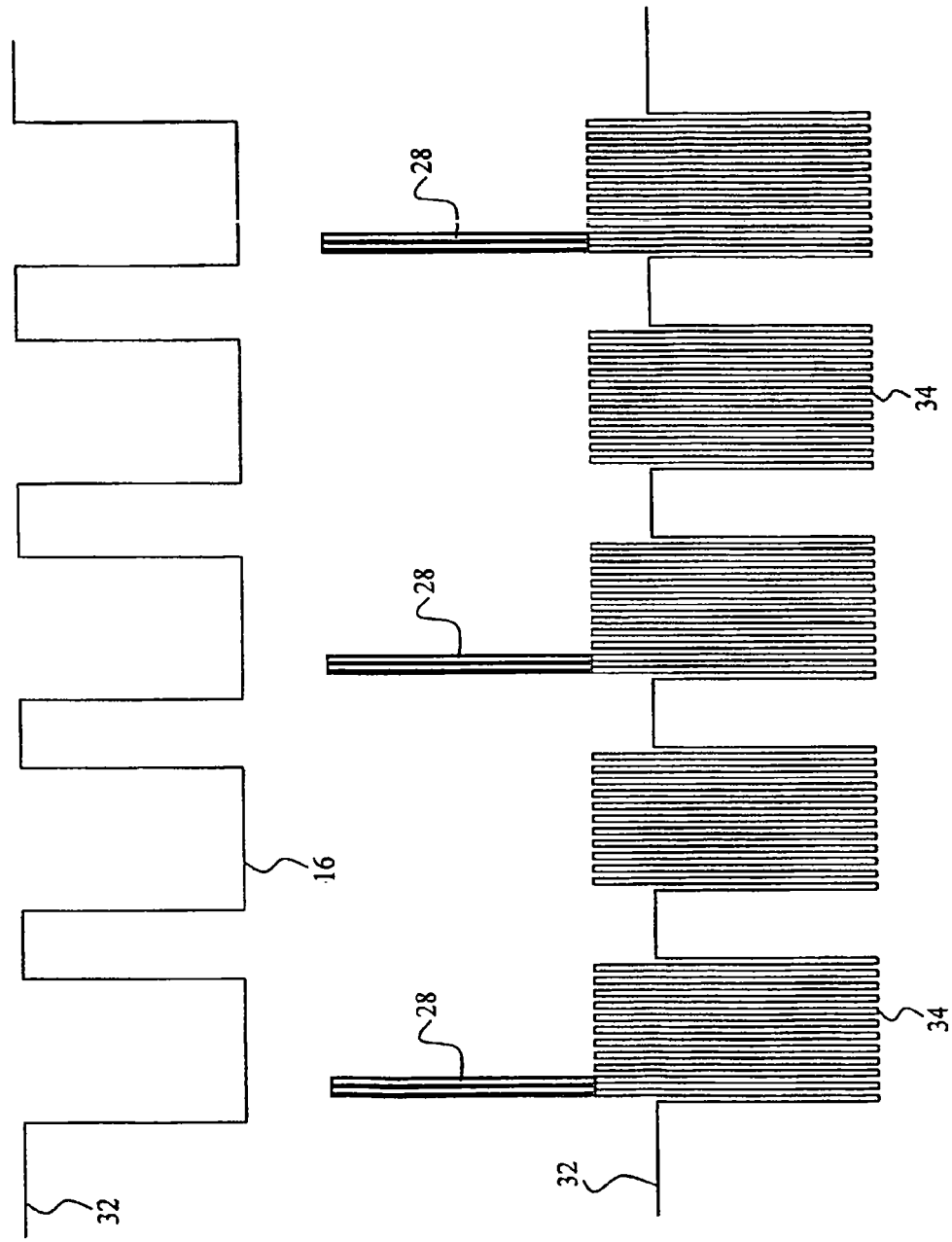

METHOD AND APPARATUS FOR PROVIDING A COPY-PROTECTED VIDEO SIGNAL

This application is a continuation of U.S. patent application Ser. No. 10/520,027, filed Aug. 5, 2005, entitled "Method and Apparatus for Providing a Copy-Protected Video Signal", now U.S. Pat. No. 8,019,201, which is a National Stage entry of PCT/GB03/02782, filed Jun. 30, 2003, which application claims priority to GB 0215040.7 filed Jun. 28, 2002, which applications are hereby incorporated by reference herein in their entireties.

This invention relates to an improved method and apparatus for providing an anti-copy video signal, in particular a video signal that has application in the field of pay-per-view television.

It is desirable for producers of video programmes, whether recorded on video cassette or broadcast, to be able to provide a signal that when received by a television receiver or display device can be viewed, but which once copied, cannot be satisfactorily viewed on the television receiver or display device. Such a signal allows broadcasters and video content producers to protect themselves against loss of revenue resulting from unauthorised copying of their signal. In the case of producers of pre-recorded video cassettes, unauthorised copying is video piracy, that is copying from one video cassette to another video cassette illegally. Often video piracy is committed with a view to selling the illegally made copies of films to the public.

In the case of broadcasters however, in particular pay-per-view TV distributors, unauthorised copying may simply be the recording of a video signal legitimately received at a digital set top box in the home onto a video cassette. Protection against this type of copying provides further advantages to the broadcasters than simply protecting against loss of revenue. By preventing unauthorised copy in the home, the broadcaster can protect the interests of the producer of the video programmes while still allowing the programme to be viewed in the home. Thus, a broadcaster may for example obtain a special agreement from a movie distributor to broadcast a movie before the movie's general video release date, allowing the broadcaster to enjoy increased rating figures, while protecting the revenue in subsequent video sales for the movie.

Various methods for modifying a video signal are known, such that when the modified signal is recorded by a video cassette recorder the recorded signal is unwatchable. However, the efficacy of such modified signals varies widely depending upon the television receiver and video recorder used to display and record the signal. We have appreciated therefore that it would be advantageous to provide an improved signal having an anti-copy effect on a wide range of television receivers and recording devices, such as video recorders.

SUMMARY OF THE INVENTION

The invention is claimed in the independent claims to which reference should now be made. Advantageous features are set forth in the dependent claims.

BRIEF DESCRIPTION OF THE DRAWINGS

The invention will now be described in more detail by way of example and with reference to the drawings in which:

FIG. 2 illustrates a line of the video picture signal shown in FIG. 1;

FIG. 3 illustrates a line of the video picture signal, according to the preferred embodiment of the invention;

FIG. 4 illustrates the addition of pulses to the modified video picture signal shown in FIG. 2, and throughout the vertical blanking section of the picture signal, as well as the addition of a modulated wave-form into the vertical synchronisation pulses, according to the preferred embodiment of the invention;

DETAILED DESCRIPTION OF THE PREFERRED EMBODIMENT

Figure 1:
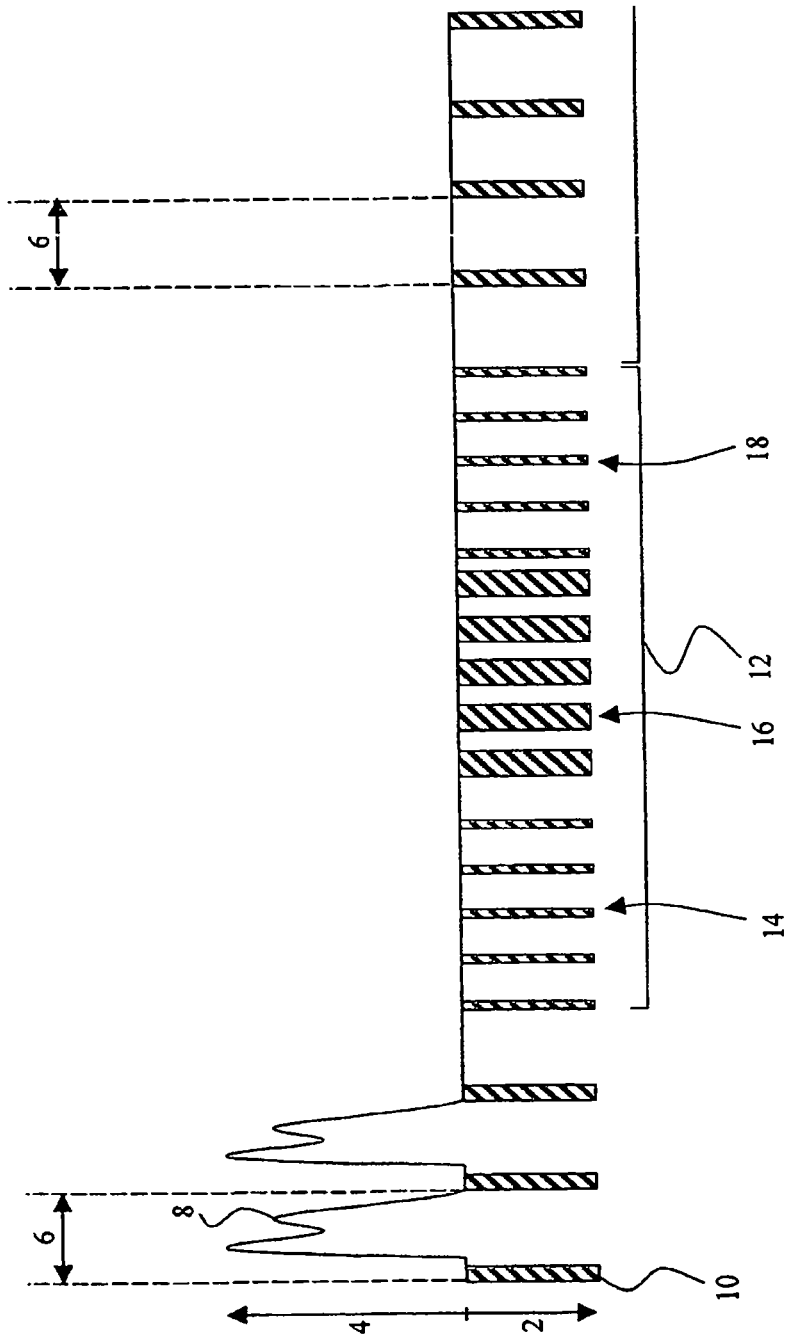
FIG. 1 illustrates a part of a known television picture signal.

FIG. 1 shows a region of a known video picture signal 1, such as a phase-alternating-line (PAL) signal. The signal comprises synchronisation information 2 for initialising the circuits of a television receiver and picture information 4. The information is arranged into 625 lines 6 which correspond to one full screen of a picture called a frame. There are 625 lines in a PAL signal making up a single frame, and each line of the signal has a length of 64 µs. The following discussion uses timing periods and other parameters based on the 625 line PAL standard. It will be appreciated that the timings and other parameters may need to be adjusted to accommodate the different television standards. It will also be appreciated that, where specific times or other parameters are referred to in the text below, the standards prescribe tolerances for such times and other parameters, and accordingly some variation is permitted from the precise values.

The picture information is displayed on a screen of a television receiver using an electron gun to sweep an electron beam across the screen from the left to the right in a single line. The electron beam also sweeps from the top of the screen to the bottom of the screen to display the lines of the picture signal, and does this twice for a PAL signal. In the first sweep, the odd numbered lines are displayed, after which the electron beam returns to the top to display the even numbered lines. Each pattern of lines displayed on the screen is called a raster and there are therefore two rasters in one frame of a PAL signal.

The picture information 4 comprises a positive going wave-form 8, the height of which above the zero-level of the video signal represents the colour to be displayed at a corresponding point on a line of the screen of the television receiver. The zero-level of the signal is called the blanking level and corresponds to the colour black displayed on the screen. Once a line of picture information has been projected on to the television screen, the electron beam must be reset to the left of the screen before the next line can be displayed. This is achieved by negative-going line synchronisation pulses 10, each of width 4.7 µs. A line synchronisation pulse 10 is positioned at the end of each line, after any picture information 8.

The video picture signal contains more lines than are usually displayed on the screen of a television receiver; not all lines of the signal are used to display picture information. In particular, two regions of blank lines are provided in the PAL signal in order to control the fly-back of the electron beam from the bottom of the screen to the top, after all of the odd or even numbered lines have been displayed. These regions are called vertical blanking regions 12 and each contains a number of synchronisation pulses which are used to reset the television receiver so that it is ready to display the next frame of picture information. The vertical blanking region contains a series of pre-equalisation pulses 14, vertical synchronisation pulses 16 and post-equalisation pulses 18. The vertical synchronisation pulses 16 can be detected in the television receiver by an arrangement of capacitors that build up charge as each vertical synchronisation pulse is received. The spacing of the vertical synchronisation pulses, and the width of the pulses is such that the charge on the capacitors increases until a threshold level is reached, triggering fly-back of the electron beam from the bottom of the television screen to the top. The pre-equalisation pulses 14, and post-equalisation pulses 18 however are spaced such that the charge on the arrangement of capacitors is reset before and after the vertical synchronisation pulses are received. This ensures reliable detection of the vertical synchronisation pulses and reliable fly-back of the electron beam to start a new raster. Only one vertical blanking region is shown in FIG. 1.

A modified picture signal according to the preferred embodiment of the invention will now be described. The modified signal comprises an additional positive going pulse added to each line of the signal throughout both the visible picture region and throughout the vertical blanking region 12 or to a substantial number of such lines. Furthermore, the modified signal comprises a first modulated wave-form added to the vertical synchronisation pulses and a second modulated wave-form added to several lines of the picture signal before the vertical blanking section. The second modulated wave-form substantially attenuates or preferably replaces the picture information 8 of those lines. The presence of all three of these features together has been found to be provide a surprising accumulative effectiveness in causing interference in the reproduction of the modified video signal during playback of the copied video signal, that is greater than the effectiveness provided by the different features taken separately. Indeed the presence of just one of the features alone may not be sufficient to result in interference in the reproduction of the copied modified video signal when it is played back. The presence of one of the features therefore increases the effectiveness of the other features, resulting in enhanced overall effect.

As well as an unexpected increased effectiveness, the modified video signal provides increased protection against any measures that might prevent the modified video signal from having an effect. Even if a television receiver is not susceptible to one of the anti-copy features, the presence of the other two are still likely to have a disruptive effect. For this reason, it is preferred if the features are added to the video signal such that the presence of two of them is enough to cause interference during playback of the copied signal.

Furthermore, if any apparatus is developed to deliberately overcome the protection provided by the preferred anti-copy video signal, it must compensate for three anti-copy features in the modified video signal not just one. If the dimensions of the features are varied from line to line or frame to frame, as described later, the three anti-copy features are even more difficult to negate.

Furthermore, the modulated picture signal according to the preferred embodiment of the invention comprises picture information 8 that has been amplified in comparison to the unmodified signal shown in FIG. 1.

Each of the features of the modified video signal will now be described in more detail with reference to FIGS. 2 to 6. FIG. 2 shows a single line 6 in the picture region of the picture signal 1 shown in FIG. 1. The line is 64 µs in length and comprises positive-going wave form 8 defining picture information and horizontal blanking section 20. The picture information of the line is known as the active line and is 52 µs in length. The horizontal blanking section is therefore 12 µs in length. It does not contain picture information and is not displayed on the screen of the television receiver, but does include synchronisation information and other information for regulating the response of the television receiver circuits. In particular, the horizontal blanking section 20 includes a horizontal or line synchronisation pulse 10 for controlling the line flyback circuits of the television receiver, and colour burst portion 22 for initialising the colour response of the television receiver to the picture signal. The horizontal line pulse is 4.7 µs in width and extends to −300 mV below the blanking level.

The region of the horizontal blanking section 20 to the left in the diagram of the horizontal line pulse 10 is called the front porch 24, while the region extending to the right of the horizontal line synchronisation pulse is called the back porch 26. The back porch extends to the start of the picture information 8.

FIG. 3 shows the corresponding region of the modified video picture signal according to the preferred embodiment of the invention for providing an anti-copy effect. The modified signal comprises a positive-going pulse 28 added to the horizontal blanking section at the beginning of the back porch 26. Preferably the height of the additional pulse 28 is 1V above the blanking level, but any height in the range 0.5V to 1.5V has been found to be acceptable preferably in the range 0.7V to 1.2V. The maximum height of the picture information wave-form 8 is about 0.7V. The pulse is added to each line 6 of the modified video signal. While the pulse is preferably added to each line, or a substantial number of the lines, addition to selected lines may achieve a sufficient result.

The additional pulse 28 preferably has a width of 1.2 µs and is situated such that it extends 0.8 µs into the horizontal line synchronisation pulse 10. Thus, the effective width of the line synchronisation pulse is reduced from 4.7 µs to 3.9 µs. The original position of the rising edge of the horizontal synchronisation pulse 10 is shown in FIGS. 2 and 3 by the dotted line 30.

The width of the additional pulse and the position in the blanking signal at which it is positioned may however be varied. As particular television receivers may be less susceptible to the effect of the additional pulses if the pulse is maintained at a particular height and at a particular position, it is preferred if the position, and height and width of the pulse are varied throughout the picture signal and indeed even from line to line. This ensures that the effect of the additional pulse 28 is likely to be encountered on a range of different television receivers despite their different responses to the recorded video signal.

The additional pulse has been found to produce satisfactory results providing it has a width in the range 0.2 µs and 4 µs, preferably 0.5 to 1.5 µs. It has also been found that the position of the pulse can be varied such that the width of the horizontal line pulse is reduced by up to 2 µs from line 30, preferably in the range 0.5 to 1.5 µs.

The effect of the pulse inserted into the horizontal blanking region is to interfere with the operation of the Automatic Gain Control (AGC) circuits of a video recorder. The AGC circuits of the video recorder typically detect the height of the synchronisation pulses in the received signal and amplify the signal so that it is at a suitable level to be recorded. The AGC circuits therefore compensate for any attenuation in the video picture signal when it is received at the video recorder.

The pulse 28 is to present a rising or falling edge of greater amplitude than the synchronisation pulse in the region where the ACG circuits sample the signal to detect the synchronisation pulse. The automatic gain control circuits are caused therefore to underestimate the amount by which the signal needs to be amplified in order to ensure that the picture quality is at a suitable level for recording. The synchronisation pulses are not therefore amplified sufficiently to achieve reliable synchronisation on a television receiver when the signal is viewed and as a result the playback quality is reduced. Apparatus and systems that work in this way are well known in the art and shall not be described further here. Further, such pulses may also be inserted after a negative going pulse, for example, in the vertical blanking interval, where the negative going pulse is misinterpreted by the video recorder as a further horizontal synchronisation pulse, and in some embodiments it may be possible to add further negative going pulses in, for example, the vertical blanking interval, which fool the video recorder in this way, followed by a pulse in accordance with the invention. In this case the pulse may be required on fewer of the lines in the modified video signal.

However, the pulse that is added in the preferred embodiment, has the additional effect of reducing the width of the horizontal line synchronisation pulse. Before recording, the reduction in width of the horizontal line synchronisation pulses 10 is not sufficient to affect the display of the picture information. However, after recording of the signal has taken place on a video cassette recorder, the reduction in width is combined with the reduction in height of the horizontal synchronisation pulse that results from insufficient amplification by the AGC circuits. This causes the line synchronisation pulses to be even less likely to be reliably detected by the television receiver.

Reference shall now be made to FIG. 4, the upper half of which shows a number of lines in the vertical blanking region 12 of the picture signal shown in FIG. 1. The five vertical synchronisation pulses 16 can be seen to extend negatively from the blanking level 32.

The modified video signal according to the preferred embodiment of the invention, is shown in the bottom half of the figure. It comprises a modulated wave-form 34 that is added into at least part of, and preferably the full width of the vertical synchronisation pulses. The modulated wave-form is preferably a square wave of frequency 400 kHz, which extends from the peak minimum level of the vertical synchronisation pulses to a height of about 315 mV above the blanking level 32. Heights of the first modulated waveform 34 in the range of 150 mV to 400 mV have been found to work well. Preferably the height of the modulated waveform is in the range 250 to 350 mV.

Other wave-forms, such as a sine-wave or a saw-tooth wave for example, could also be used. Furthermore, it has been found that the frequency of the modulated wave-form can be varied from 100 kHz to 6.5 MHz. Preferably the frequency is in the range 200 kHz to 1 MHz, more preferably 300 kHz to 600 kHz. Preferably the signal is added to at least 80% of the width of the vertical synchronisation pulse, preferably to the full width of each pulse.

The effect of the modulated wave-form is to partially cancel out the vertical synchronisation pulses 16 making them harder to detect in the television receiver. Before the modified video signal is recorded, the height of the modulation is not sufficient to have an effect on the display of the modified signal. During recording however, the video signal is amplified according to an amount determined by the AGC circuits of the video recorder. The maximum amplitude of the negative-going synchronisation pulses is clamped at a value of approximately −300 mv relative to the blanking level to ensure that the synchronisation pulses of the recorded signal are suitable for detection by a television receiver. As a result of the clamping in the negative region of the signal, the positive region of the signal is amplified with respect to the negative region. This amplification of the positive part of the signal during recording has the effect of amplifying the positive part of the modulated wave-form, thereby cancelling more of the vertical synchronisation pulse.

This can also be understood from a consideration of the average voltage level of the vertical synchronisation pulse. After recording the average voltage level of the vertical synchronisation pulses 16 comprising the modulation is higher than the average voltage level before recording, owing to the recording-induced-increase in the maximum positive amplitude of the modulation.

As a result, the capacitor arrangement in the television receiver which detects the vertical synchronisation pulse may not be able to charge beyond the threshold level as quickly as before, or even at all before the last vertical synchronisation pulse is received. The television receiver is more likely therefore to experience difficulty in synchronising fly-back between frames. This will cause the picture displayed on the screen of the television receiver to jump and jitter making it unpleasant to watch. The effect of these pulses, may be realised after a single recording, or after several recordings depending upon the amount of amplification. Even if a first unauthorised recording of the modified video signal is successfully made, in which the height of the pulses is insufficient to have an effect, subsequent recordings will raise the height of the pulses to a level at which it is likely to have an effect.

It can be seen from this figure that the additional pulse 28 is inserted not just in the picture region but at every line of the video picture signal including those in the vertical blanking region. The additional pulses 28 inserted into the vertical blanking region add to the effect of the modulation 34 by further partially cancelling the vertical synchronisation pulses. The effect of these additional pulses is also increased by recording of the signal.

Figure 5:
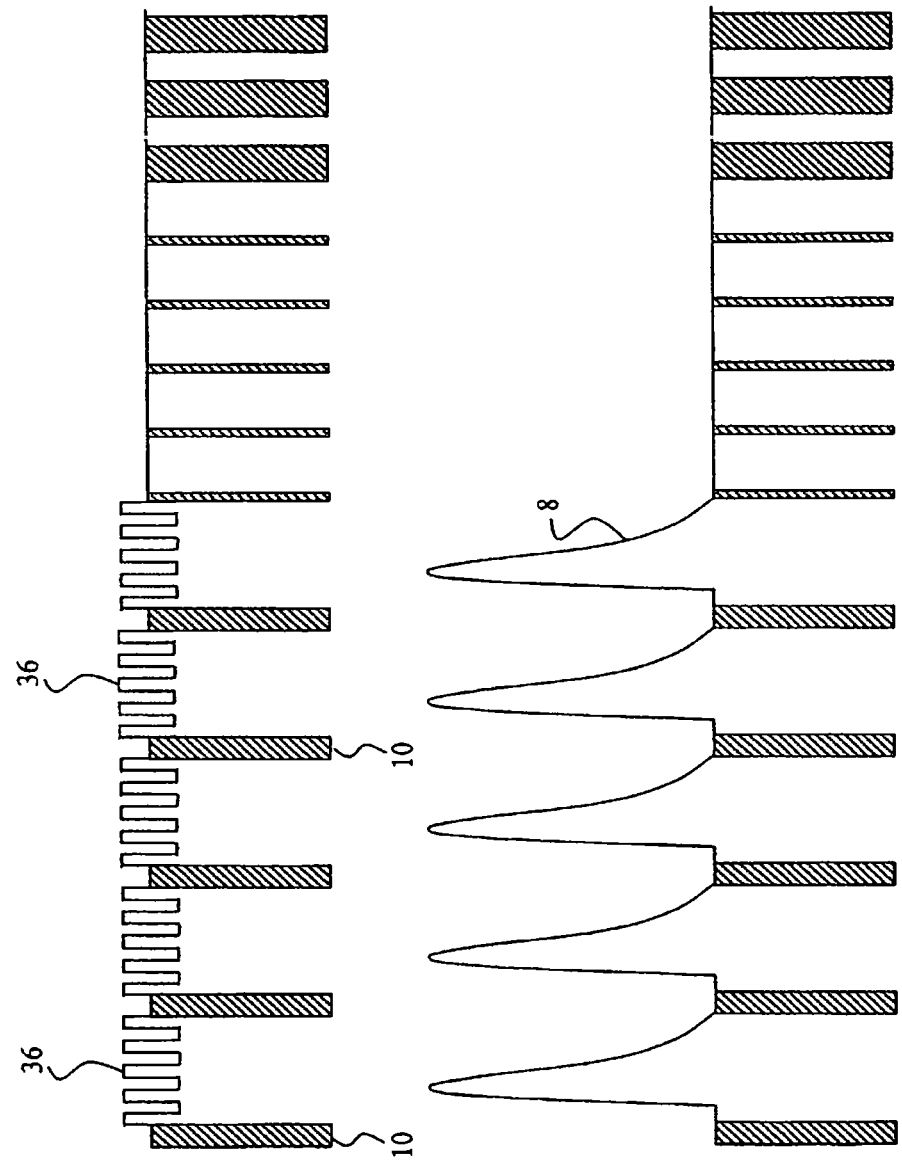
FIG. 5 illustrates the addition of a modulation signal prior to the vertical blanking section of the video picture signal shown in FIG. 1, according to the preferred embodiment of the invention.

FIG. 5 to which reference should now be made shows in more detail another feature of the modified video picture signal in a preferred embodiment. Lines of picture information 8 prior to the vertical blanking section 12 of the picture signal are removed and replaced by a modulated wave form 36. Though these lines contain picture information, they are not normally within the visible region displayed on the screen and can therefore be manipulated without any material loss in picture quality.

An unmodified video signal is shown in the bottom half of FIG. 5 by way of comparison.

The modulated wave form 36 is preferably centred about the DC level and has an amplitude in the range 40 to 150 mV (that is a peak-to-peak amplitude of 80 mV to 300 mV), more preferably 60 to 100 mV. A preferred amplitude has been found to be about 80 mV, in particular 84 mV. The frequency of the modulated wave is preferably in the range 10 kHz to 2 MHZ, more preferably 50 kHz to 1 MHz, especially 100 kHz to 400 kHz. A frequency of 220 kHz and particularly 200 kHz has been found to be favourable in practice. The pulse 28 which is added to the lines of the picture signal is not shown in FIG. 5 for the sake of clarity.

Although a square wave form is shown in FIG. 5, it will be appreciated that alternative wave forms such as a sine wave or saw-tooth waves may also be used. Preferably, the modulated wave-form is added to 12 lines of picture information at the bottom of the picture signal before the vertical blanking region. In practice it has been found that the wave-form may be added to just 5 lines or up to 15 lines. If more than 15 lines are modified in this way, it is possible that the modulation may become visible on the television screen of the television receiver.

The effect of inserting the modulated wave-form into the lines of picture information is to cause the voltage level in the recorded video signal in the region of modulated wave-form to fall off with time. As a result, the signal may drop to a level where it is mistaken for a synchronisation pulse, causing the television receiver to experience difficulty in synchronising the recorded signal on playback.

As described earlier, the modified video picture signal according to the preferred embodiment of the invention, comprises amplified video picture information 8, in comparison to the unmodified video picture signal shown in FIG. 1. It has been found advantageous to amplify the picture information because of the increase in the dc level of the modified video signal caused by the additional pulses 22. As a result of this increase, the amplitude of the video picture information appears smaller in comparison. The AGC circuits of the television receiver do not therefore amplify the signal by a sufficient amount and as a result the modified picture video signal appears dark when viewed on a television receiver even if it has not been recorded.

The picture information in the preferred embodiment is therefore amplified, preferably after the additional pulses, and the first and second modulated wave-form have been added to a signal to produce a modified signal. Preferably, the amplification is achieved by adding 100 mV to the picture information signal across its entire width. The term amplify is used in this specification to include such level shifting. Preferably the level shifting is in the range 50 mV to 150 mV. The amplification causes the amplitude of the picture signal to increase from a maximum value, corresponding to the peak white level, of 700 mV to 800 mV. Alternatively, the picture information 8 may be multiplied by a scaling factor to provide the amplification. Preferably the scaling factor will result in the peak amplitude being increased by the equivalent amount as the level shifting discussed above. Level shifting and scaling may be used together.

Only the part of the signal containing picture information, that is the active line, is amplified. The horizontal blanking interval 30, is not amplified as this may contain the additional pulse 28.

The amplification applied to the signal is chosen such that the signal appears on the screen of a television receiver at an improved brightness for viewing. The change in brightness caused by the amplification will vary from television receiver to television receiver depending on its construction. Preferably, if the type of television receiver on which the modified picture signal is to be viewed is known, the amplification applied to the picture information can be provided at a level suitable for that television receiver. In the case of pay-per-view television, information about the television receiver may be collected from subscribers when they first subscribe to the service. Although, it is not necessary that they provide information about their television receiver, doing so will allow them to receive a modified video signal adjusted to be viewable at the optimum brightness for their receiver. The invention also encompasses the use of such information, as in the case of a person seeking to reduce the impact of the modifications proposed in accordance with this invention, to reduce the impact of such modifications, for example by programming the system with information for a television other than that used, with the object of making the impact of the modification less.

Figure 6:
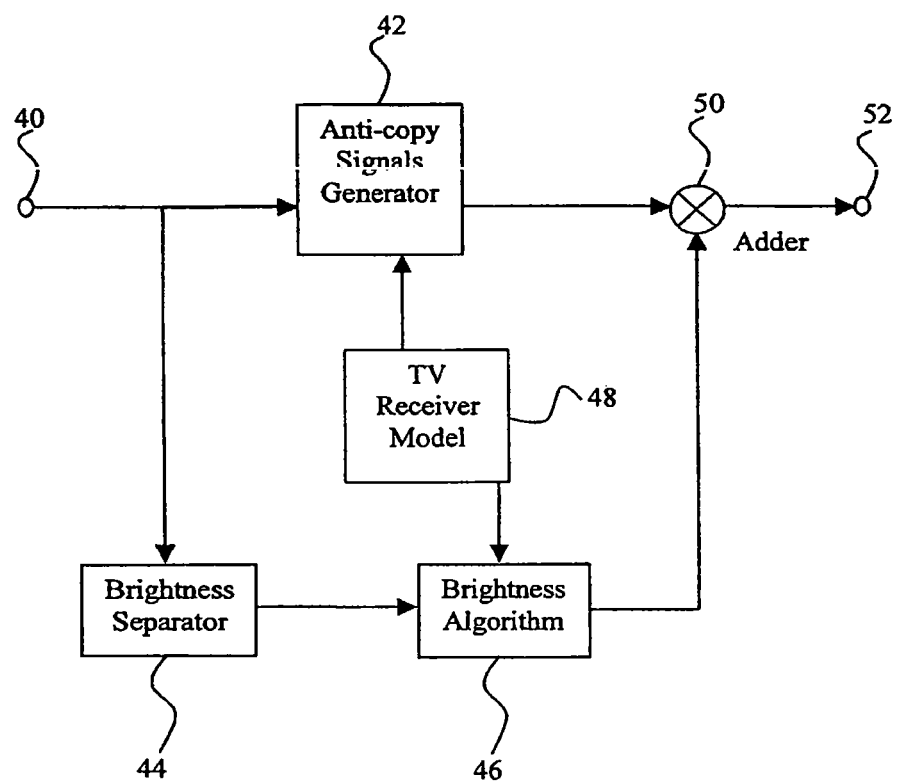
FIG. 6 is a schematic illustration of apparatus for generating the modified wave form according to the preferred embodiment of the invention.

FIG. 6 is a schematic diagram of an apparatus for generating a modified video picture signal in accordance with the preferred embodiment of the invention from an ordinary video picture signal.

Unmodified video picture signal is first received at input 40. The signal is then passed to Anti-Copy Signal Generator 42 and to Brightness Separator 44.

The Anti-copy Signals Generator generates the additional pulses 28, as well as the first and second modulated wave-forms 34 and 36 for insertion into the vertical synchronisation pulses and the lines before the vertical blanking region, and inserts the pulses and modulated wave-forms into the signal as described.

The Brightness Separator 44 extracts the brightness information from the received video signal, and passes this in the form of a brightness signal to Brightness Algorithm 46 which also receives input from TV Receiver Model 48. The Brightness Algorithm determines from the TV Receiver Model the desired amount of amplification that is required for the picture information of the signal. The picture information may be amplified by the addition of a constant signal, such as 100 mV as in the preferred embodiment, or by multiplying the picture information by a scaling factor.

The TV Receiver Model 48 comprises information specifying the amount of amplification required for different respective television receivers. The information may be calculated empirically, and may be stored in a look-up table for example. If the information describing the type of television receiver has been provided by a Pay-Per-View television subscriber, then the look-up table can be referred to obtain the amplification necessary to give the optimum increase in brightness of the signal following modification for that receiver. A generic television type may be provided in the look-up table to be used when no information about the destination television receiver of the subscriber is known, or when the destination television receiver happens not to be included in the table.

The TV Receiver Model 48 is also coupled to Anti-copy signals generator 42. As explained before the dimensions of the additional pulse 28 and first and second modulated wave-forms, such as height, width, frequency and position for example, can be altered. Different values for these figures have different effects on different television receivers. If the type of the destination television receiver on which the modified video signal is to be viewed is known, it is therefore possible to add the pulses, and modulation effects with parameters that produce the optimum effect when viewed on that television receiver. In this way the effect of the modified video signal can be tailored to suit a particular receiver. The Anti-copy signals generator therefore consults the look-up table before adding the pulses and modulations to obtain the optimum values. A generic response which comprises a range of figures for the dimensions and positions of the pulses and the dimensions of the modulated wave-forms are provided if the television receiver type is not known, or is not included in the table. The Anti-copy signals generator can then vary the dimensions and position of the pulses, and the dimensions of the modulated wave-forms within the range in order to ensure the effect of the anti-copy signals are visible on a wide range of receivers.

The amplification specified by the TV Receiver Model is applied by the Brightness Algorithm 46 to the brightness signal supplied by the Brightness separator 44. The amplified brightness signal is then passed to adder 50, which also receives the modified signal from the Anti-copy signal generator. Adder 50 adds the amplified brightness signal into the modified video signal replacing the original brightness information in the modified video signal, to form a final modified signal which is supplied to an output 52.

It will be appreciated that the apparatus shown in FIG. 6 may be implemented in software on a computer or as hardware, such as a processor. It will further be appreciated that different elements of the modified signal, for example the pulse, and first and second modifications, may be added together prior to modifying the unmodified signal, and these elements then added to the unmodified signal all at once, or such elements may be added sequentially to the unmodified signal, or a combination of these may be adopted. Moreover, where for example the process is applied in apparatus which also converts a digital signal to an analog signal, the different elements of the signal may be generated separately and added together. In such case there may not be a pre-existing unmodified signal.

Although, the invention has been described with reference to a video cassette recorder, the invention has equal application to DVD recorders, digital video recorders and video recorders using video capture cards.

There is also provided a process (a circumvention process) for making acceptable copies of a video signal which has been modified or generated in accordance with the invention, comprising removing the added components or at least some, especially at least two of them, or reducing the effects of the added components or some of them, especially at least two of them, to an acceptable level. For example such a process may comprise inserting a signal which cancels or reduces one or more of the added components, or by replacing the section of the video signal which has been modified by the inclusion of the added components by a section which is acceptable to the video recorder system or television, or by inserting a signal which is interpreted by video recorder system in a manner which cancels the effect of the disruption component. In this context acceptable does not necessarily mean that the copy is free from any artefacts that have been introduced by the copy protection; rather than the effect of such copy protection has been reduced to such an extent that the picture is viewable. In the most attractive embodiments of course the removal of the effects will result in a copy free from or substantially free from the effects of the copy protection signal.

Where the circumvention process comprises the addition of a further signal which cancels signal of the added component, this will depend on the nature of the signal of the added component. For example, if in the relevant disruption component, there is added a pulse after the horizontal sync pulse, the effect of this may be counteracted by replacing all or a substantial proportion of such pulse by a back porch level immediately following the horizontal sync pulse by a level close to the normal blanking level, or alternatively by replacing the back porch region immediately after the horizontal sync pulse by a level below the blanking level, in at least some cases. It will be appreciated that this may involve also cancelling some, but not necessarily all of the existing pulses where it is decided to lower the level of the back porch to below the blanking level at a location where there is one of the added pulses.

In relation to the first modulated wave form, the vertical sync pulses may be recreated. Alternatively, the tops of the added signal (the parts above blanking level) could be clipped or further reduced in amplitude either before or after a recording is made. An example of a process for achieving this is an apparatus which determines the position of the vertical sync pulses and switches in a shunt which shunts all signal levels above a predetermined level, for example blanking level or above, either exactly where the vertical synchronisation pulses occur or in that region.

An apparatus for carrying out the circumvention process will typically include at means for circumventing at least two of the added components. The second modulated waveform may be counteracted by the addition to it, or replacement of it, by a zero level signal or a signal which is more similar to an active video signal in at least some of active video lines at the beginning of the vertical overscan portion of the signal, for example by stepped waveform which rises from zero to full white level, or a waveform which rises from zero to full white and descends back to zero again.

Figure 7:
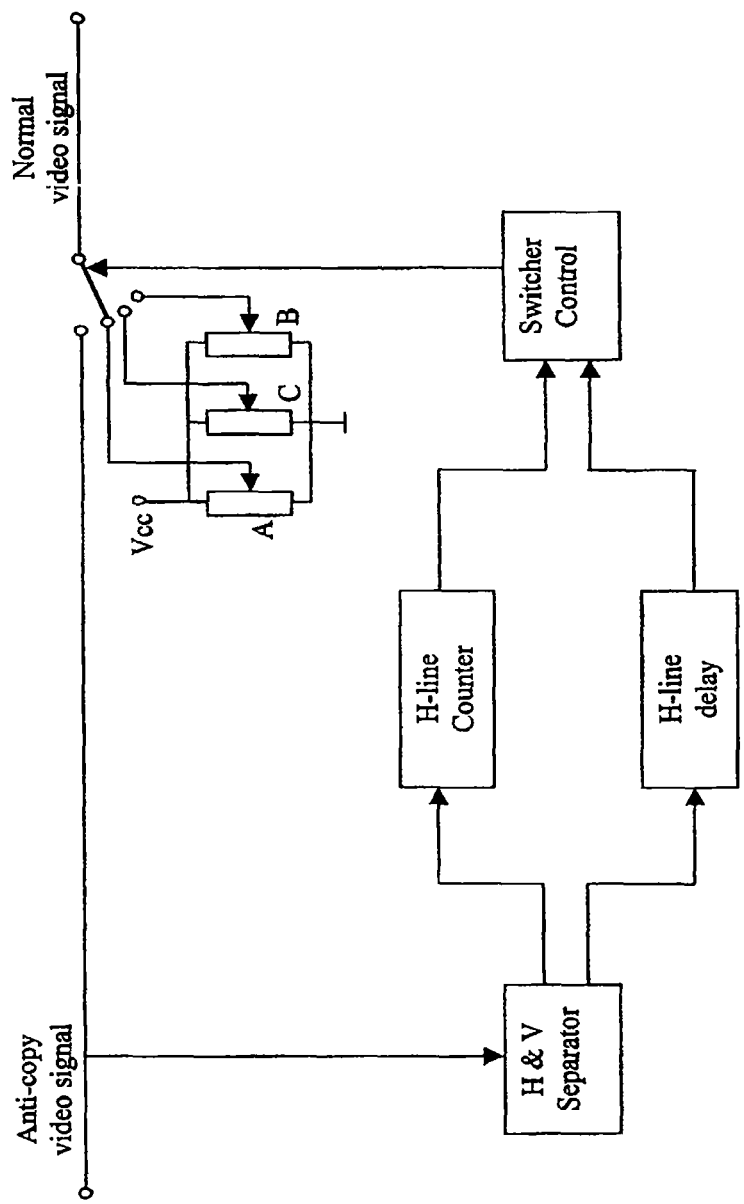
FIG. 7 is a block diagram of a circumvention apparatus to remove the anticopy signal.

FIG. 7 show a block diagram of an apparatus for circumventing the anti copy signal. In FIG. 7, the H & V sync separator separates the timing signals, horizontal and vertical synchronization pulses of the copy-protected video signal. To remove the AGC pulses, the switcher control will connect to the output (which is set up to the blanking level) of the adjustable resistor A during the AGC pulses. The switcher control is controlled by the delayed horizontal synchronization pulses. The H-line counter produces the starting and ending control signals for controlling the switcher connecting to the blanking level or 0V level to remove the 200 kHz and the 400 kHz signals, respectively.

The invention claimed is:

1. A method of altering a program signal to provide protection against copying on a program recording device, the method comprising:
   receiving the program signal, the signal being divided into frames each having a plurality of lines of information, each line of information comprising a horizontal blanking interval, and each frame having a vertical blanking interval that comprises synchronization pulses for synchronization of the program on the screen of a receiver;
   adding at least one pulse into the program signal during the horizontal blanking intervals of at least some of the lines that contain picture information and also adding at least one pulse into the vertical blanking interval of the program signal, wherein the at least one pulse added during the horizontal blanking interval is positioned to partially overlap a horizontal synchronization pulse in the horizontal blanking interval and has a magnitude that is greater than a maximum magnitude of the picture information;
   additionally adding a first modulation signal to vertical synchronization pulses of the program signal;
   wherein the pulses and the first modulation signal added to the program signal are cumulatively configured such that when the signal is copied by the recording device, interference is produced in the reproduction of the copied signal that is not visible in the reproduction of an uncopied program signal.

2. The method of claim 1 further comprising adding a second modulation signal to the lines of picture information in the vicinity of the vertical blanking region.

3. The method of claim 2 wherein the lines of the picture information with the added second modulation signal are located at the bottom of a frame of the program signal.

4. The method of claim 3 wherein the second modulation signal is configured such that when the signal is copied by the recording device, interference is produced in the reproduction of the copied signal that is not visible in the reproduction of an uncopied program signal.

5. A method according to claim 4, wherein at least one of the number of lines to which the second modulation signal is added, the amplitude of the modulation signal is varied from frame to frame of the program signal.

6. A method according to claim 4, wherein at least one of the number of lines to which the second modulation signal is added, the frequency of the modulation signal is varied from frame to frame of the program signal.

7. A method according to claim 4, wherein at least one of the number of lines to which the second modulation signal is added, both the amplitude of the modulation signal and the frequency of the modulation signal are varied from frame to frame of the program signal.

8. A method according to claim 2, wherein at least one of the number of lines to which the second modulation signal is added, the amplitude of the modulation signal is varied from frame to frame of the program signal.

9. A method according to claim 2, wherein at least one of the number of lines to which the second modulation signal is added, the frequency of the modulation signal is varied from frame to frame of the program signal.

10. A method according to claim 2, wherein at least one of the number of lines to which the second modulation signal is added, the amplitude of the modulation signal, and the frequency of the modulation signal is varied from frame to frame of the program signal.

11. A method according to claim 1, wherein the pulse, and first and second modulation signals are added to the program signal in dependence on information relating to the type of receiver on which the program signal is to be viewed.

12. An apparatus to modify a program signal to provide protection against copying on a recording device, the apparatus comprising:
an input for receiving a program signal divided into video frames, each video frame comprising lines of information and a vertical blanking region, each line of information comprising horizontal synchronization pulses and a horizontal blanking interval, and the vertical blanking region comprising vertical synchronization pulses for synchronizing the program on the screen of a receiver;
an output for outputting a modified program signal;
a first adder configured to add at least one pulse into the program signal during the horizontal blanking interval of at least some of the lines of information that contain picture information and also adding at least one pulse into the vertical blanking region of the program signal, wherein the at least one pulse added during the horizontal blanking interval is positioned to partially overlap a horizontal synchronization pulse in the horizontal blanking interval and has a maximum magnitude that is greater than a maximum magnitude of the picture information; and
a second adder configured to additional add a first modulation signal to the vertical synchronization pulses of the program signal;
wherein the pulses and said first modulation signal added to the program signal are cumulatively sufficient such that when the modified program signal is copied by a recording device, interference is produced in the reproduction of the copied signal that is not visible in the reproduction of an uncopied program signal.

13. The apparatus of claim 12 further comprising a third adder configured to add a second modulation signal to lines of picture information in the vicinity of the vertical blanking region at the bottom of a frame of the program signal.

14. The apparatus of claim 13 wherein the second modulation signal added to the program signal has a magnitude such that when the modified program signal is copied by a recording device, interference is produced in the reproduction of the copied signal that is not visible in the reproduction of an uncopied program signal.

15. The apparatus of claim 14, wherein at least one of the number of lines to which the second modulation signal is added, both the amplitude of the modulation signal and the frequency of the modulation signal are varied from frame to frame of the program signal.

16. The apparatus of claim 14, wherein at least one of the number of lines to which the second modulation signal is added, the amplitude of the modulation signal is varied from frame to frame of the program signal.

17. The apparatus of claim 14, wherein at least one of the number of lines to which the second modulation signal is added, the frequency of the modulation signal is varied from frame to frame of the program signal.

* * * * *